(12) United States Patent
Huang

(10) Patent No.: US 11,044,410 B2
(45) Date of Patent: Jun. 22, 2021

(54) IMAGING CONTROL METHOD AND APPARATUS, ELECTRONIC DEVICE, AND COMPUTER READABLE STORAGE MEDIUM

(71) Applicant: Guangdong Oppo Mobile Telecommunications Corp., Ltd., Guangdong (CN)

(72) Inventor: Jiewen Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 57 days.

(21) Appl. No.: 16/536,841

(22) Filed: Aug. 9, 2019

(65) Prior Publication Data

US 2020/0053267 A1     Feb. 13, 2020

(30) Foreign Application Priority Data

Aug. 13, 2018   (CN) .......................... 201810915438.0

(51) Int. Cl.
*H04N 5/235* (2006.01)
*H04N 5/265* (2006.01)

(52) U.S. Cl.
CPC ......... *H04N 5/2351* (2013.01); *H04N 5/2353* (2013.01); *H04N 5/2355* (2013.01); *H04N 5/265* (2013.01)

(58) Field of Classification Search
CPC .. H04N 5/2351; H04N 5/2353; H04N 5/2355; H04N 5/265

(Continued)

(56) References Cited

U.S. PATENT DOCUMENTS

2012/0105681 A1* 5/2012 Morales ................ H04N 5/235
348/239
2012/0120279 A1   5/2012 Li
(Continued)

FOREIGN PATENT DOCUMENTS

CN   103222259 A   7/2013
CN   106412447 A   2/2017
(Continued)

OTHER PUBLICATIONS

US 8,736,750 B2, 05/2014, Asoma (withdrawn)
(Continued)

*Primary Examiner* — Joel W Fosselman

(57) ABSTRACT

The present disclosure provides an imaging control method and apparatus, an electronic device, and a readable storage medium. The imaging device includes a pixel unit array composed of a plurality of photosensitive pixel units, and the method includes: determining whether a shooting scene of the image device is a dim environment; determining an exposure ratio of a long exposure pixel to a short exposure pixel of the imaging device when the shooting scene is the dim environment; determining that the shooting scene is with a high dynamic range, when the exposure ratio is greater than a first exposure ratio threshold; controlling a pixel unit array of the imaging device to expose for a plurality of times with at least two exposure durations, to generate a plurality of first images; and composting the plurality of first images to generate a composited image.

12 Claims, 5 Drawing Sheets

(58) Field of Classification Search
USPC .................................................... 348/216.1
See application file for complete search history.

(56) References Cited

U.S. PATENT DOCUMENTS

| | | |
|---|---|---|
| 2015/0116538 A1 | 4/2015 | Terauchi et al. |
| 2015/0244917 A1 | 8/2015 | Huang et al. |

FOREIGN PATENT DOCUMENTS

| | | | |
|---|---|---|---|
| CN | 107040730 A | | 8/2017 |
| CN | 107301405 A | | 10/2017 |
| CN | 107534737 A | | 1/2018 |
| CN | 108200354 A | | 6/2018 |
| CN | 108270977 A | | 7/2018 |
| CN | 108322669 A | | 7/2018 |
| CN | 109005364 A | | 12/2018 |
| EP | 3270583 A1 | | 1/2018 |
| JP | 2011244309 A | | 12/2011 |
| WO | 2014020970 A1 | | 2/2014 |
| WO | 2017141544 A1 | | 8/2017 |

OTHER PUBLICATIONS

Extended European search report issued in corresponding European application No. 19191416.7 dated Oct. 29, 2019.
International search report issued in corresponding international application No. PCT/CN2019/100246 dated Oct. 30, 2019.
OA with English translation for CN application 201810915438.0 dated Sep. 2, 2019.
European Examination Report for EP Application 19191416.7 dated Feb. 23, 2021. (7 pages).
India Examination Report for IN Application 201914032669 dated Feb. 24, 2021. (6 pages).

* cited by examiner

|   | 1 | 2 | 3 | 4 | 5 | 6 | 7 | 8 |
|---|---|---|---|---|---|---|---|---|
| 1 | R (L) | R (M) | G (L) | G (M) | R (L) | R (M) | G (L) | G (M) |
| 2 | R (M) | R (S) | G (M) | G (S) | R (M) | R (S) | G (M) | G (S) |
| 3 | G (L) | G (M) | B (L) | B (M) | G (L) | G (M) | B (L) | B (M) |
| 4 | G (M) | G (S) | B (M) | B (S) | G (M) | G (S) | B (M) | B (S) |
| 5 | R (L) | R (M) | G (L) | G (M) | R (L) | R (M) | G (L) | G (M) |
| 6 | R (M) | R (S) | G (M) | G (S) | R (M) | R (S) | G (M) | G (S) |
| 7 | G (L) | G (M) | B (L) | B (M) | G (L) | G (M) | B (L) | B (M) |
| 8 | G (M) | G (S) | B (M) | B (S) | G (M) | G (S) | B (M) | B (S) |

FIG. 3

IMAGING CONTROL METHOD AND APPARATUS, ELECTRONIC DEVICE, AND COMPUTER READABLE STORAGE MEDIUM

CROSS-REFERENCE TO RELATED APPLICATION(S)

This application claims priority to Chinese Patent Application Serial No. 201810915438.0, filed on Aug. 13, 2018, the entire content of which is incorporated herein by reference.

TECHNICAL FIELD

The present disclosure relates to a field of electronic device technology, and more particularly, to an imaging control method and apparatus, an electronic device, and a computer readable storage medium.

BACKGROUND

As terminal technology develops, more and more users use electronic devices to capture images. In a backlight scene, when the user uses a front camera of the electronic device to take selfies, since the user is located between the light source and the electronic device, the face exposure is likely to be insufficient. If the exposure is adjusted to increase the brightness of the face, the background region will be overexposed, and even the shooting scene will not be clearly displayed.

In order to improve the quality of shooting in high dynamic range scenes such as the backlight scene, it is common to improve the imaging effect of images by compositing images with different exposure degrees during shooting.

However, the image quality of the image captured in this way varies with the shooting scene. In some shooting scenes, although the dynamic range is large, the imaging effect is not good. Therefore, this single shooting mode cannot cope with multiple shooting scenes.

SUMMARY

The present disclosure aims to solve at least one of the above problems to at least some extent.

For this, the present disclosure provides an imaging control method, an imaging control apparatus, an electronic device, and a computer readable storage medium.

Embodiments of a first aspect of the present disclosure provide an imaging control method. The imaging control method is applicable to an imaging device and includes:

determining whether a shooting scene of the imaging device is a dim environment;

determining an exposure ratio of a long exposure pixel to a short exposure pixel of the imaging device when the shooting scene is the dim environment;

determining that the shooting scene is with a high dynamic range, when the exposure ratio is greater than a first exposure ratio threshold;

controlling a pixel unit array of the imaging device to expose for a plurality of times with at least two exposure durations, to generate a plurality of first images; and compositing the plurality of first images to generate a composited image.

Embodiments of a second aspect of the present disclosure provide an imaging control apparatus. The imaging control apparatus includes a memory and a processor. The memory is configured to store software modules executable by the processor. The processor is configured to run a program corresponding to the software modules by reading the software modules stored in the memory. The software modules include:

a first determining module, configured to determine whether a shooting scene of the imaging device is a dim environment;

a second determining module, configured to determine an exposure ratio of a long exposure pixel to a short exposure pixel of the imaging device when the shooting scene is the dim environment;

a third determining module, configured to determine that the shooting scene is with a high dynamic range when the exposure ratio is greater than a first exposure ratio threshold;

a control module, configured to, when the shooting scene is with the high dynamic range, control a pixel unit array of the imaging device to expose for a plurality of times with at least two exposure durations to generate a plurality of first images; and a processing module, configured to perform compositing process according to the plurality of first images to generate a composited image.

Embodiments of a third aspect of the present disclosure provide an electronic device. The electronic device includes a housing, a memory, a processor, a circuit board, a power supply circuit and an imaging device. The circuit board is arranged inside a space enclosed by the housing. The processor and the memory are disposed on the circuit board. The power supply circuit is configured to provide power for respective circuits or components of the electronic device. The imaging device includes a pixel unit array composed of a plurality of photosensitive pixel units, each photosensitive pixel unit includes a plurality of original pixels, and the plurality of original pixels in each photosensitive pixel unit include long exposure pixels, short exposure pixels and medium exposure pixels. The memory is configured to store executable program codes. The processor is configured to run a program corresponding to the executable program codes by reading the executable program codes stored in the memory, to perform operations of the imaging control method described in embodiments of the first aspect of the present disclosure.

Embodiments of a fourth aspect of the present disclosure provide a computer readable storage medium having a computer program stored thereon, wherein the computer program is configured to be executed by a processor to implement the imaging control method as illustrated in the above embodiments of the present disclosure.

Additional aspects and advantages of the present disclosure will be given in part in the following descriptions, become apparent in part from the following descriptions, or be learned from the practice of the embodiments of the present disclosure.

BRIEF DESCRIPTION OF DRAWINGS

These and other aspects and/or advantages of embodiments of the present disclosure will become apparent and more readily appreciated from the following descriptions made with reference to the accompanying drawings, in which:

FIG. 3 is a schematic diagram of a pixel unit array of an imaging device according to an embodiment of the present disclosure.

DETAILED DESCRIPTION

Figure 1:
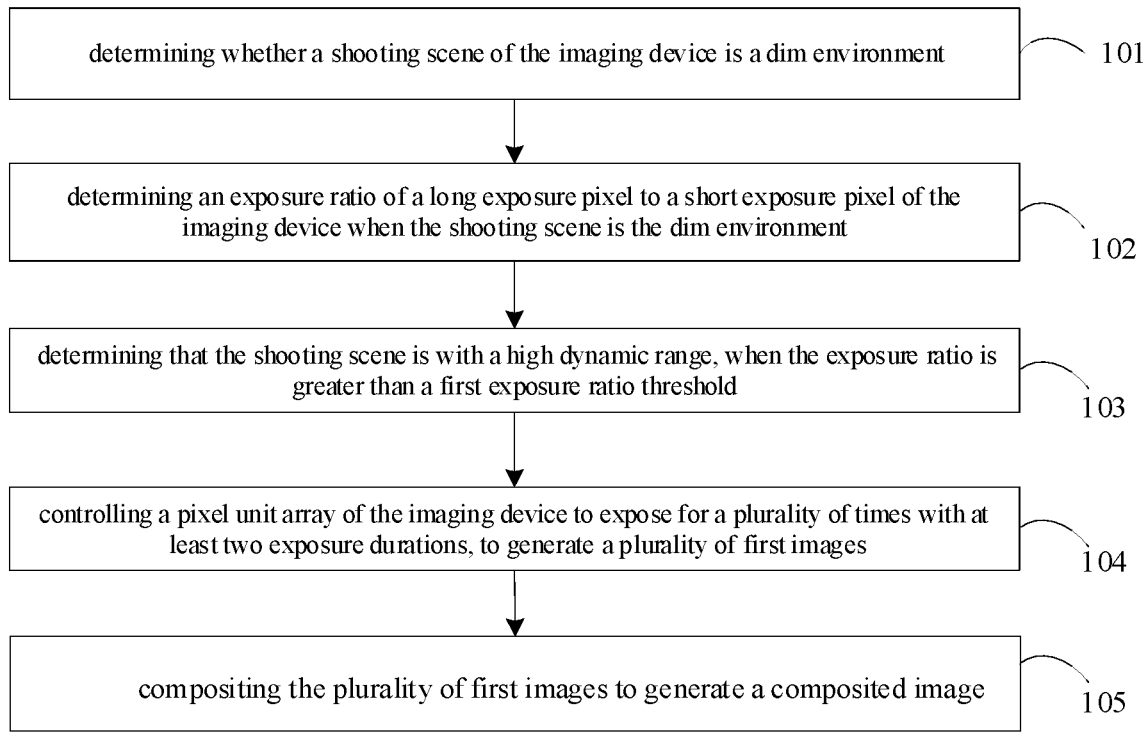
FIG. 1 is a schematic flowchart of an imaging control method according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the related art, in order to improve the shooting quality in a high dynamic range scene, such as a backlighting scene, it is common to perform long exposure, medium exposure, and short exposure respectively by controlling the pixel array during the shooting process, and then composite the images obtained at different exposure degrees to output the captured image, to improve the imaging effect of the image. However, the image quality of the image captured in this way varies with the shooting scene, and in some shooting scenes, the desired shooting effect cannot be achieved.

In view of the above problems, the present disclosure provides an imaging control method. The imaging control method is applicable to an imaging device, and includes: determining whether a shooting scene of the imaging device is a dim environment; determining an exposure ratio of the long exposure pixel to the short exposure pixel when the shooting scene is the dim environment; determining that the shooting scene is with a high dynamic range, when the exposure ratio is greater than a first exposure ratio threshold; controlling the pixel unit array to expose for a plurality of times with at least two exposure durations, to generate a plurality of first images; and composting the plurality of first images to generate a composited image.

The imaging control method and apparatus of embodiments of the present disclosure will be described below with reference to the drawings.

FIG. 1 is a schematic flowchart diagram of an imaging control method according to an embodiment of the present disclosure.

The imaging control method of embodiments of the present disclosure is applied to an imaging device. The imaging device includes a pixel unit array composed of a plurality of photosensitive pixel units, each of the photosensitive pixel units comprises a plurality of original pixels, in which the original pixels are long exposure pixels, short exposure pixel or medium exposure pixel.

Figure 2:
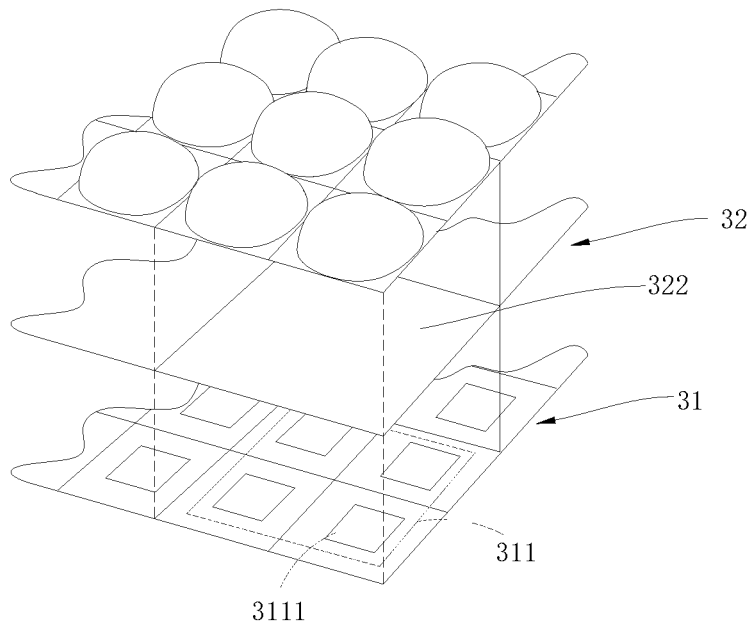
FIG. 2 is a schematic diagram illustrating a portion of an imaging device according to an embodiment of the present disclosure.

As an example, as illustrated in FIG. 2, the imaging device includes a pixel unit array 31 and a filter unit array 32 disposed on the pixel unit array 31. The pixel unit array 31 includes a plurality of photosensitive pixel units 311, and each of the photosensitive pixel units 311 includes a plurality of photosensitive pixels 3111. The filter unit array 32 includes a plurality of filter units 322 corresponding to the plurality of the photosensitive pixel units 311, and each of the plurality of filter units 322 covers a corresponding photosensitive pixel unit 311. Each of the photosensitive pixel units 311 in the pixel unit array 31 includes a plurality of original pixels, in which the plurality of original pixels in each photosensitive pixel unit 311 include long exposure pixels, short exposure pixels, and medium exposure pixels.

As illustrated in FIG. 1, the imaging control method includes the followings.

At block 101, it is determined whether a shooting scene of the imaging device is a dim environment.

In embodiments of the present disclosure, an ISO or a exposure duration of a preview image of the imaging device in the current shooting scene is first acquired, in which the ISO value is used to indicate the photosensitivity of the camera. If the acquired ISO or exposure duration of the shooting scene is greater than a corresponding first parameter threshold, it is determined that the shooting scene is the dim environment. The first parameter threshold may be set, such that the ISO parameter value is 400 and the exposure duration is 30 ms.

The ISO value of the preview image in the shooting scene can be obtained by reading the ISO value automatically adjusted by the camera of the imaging device.

In embodiments of the present disclosure, the exposure duration may be preset in a built-in program of the electronic device, or may be set by the user, and the exposure duration of the preview image in the shooting scene may be acquired by the imaging device.

After determining that the shooting scene is the dim environment, it may be further determined whether the ISO or exposure duration of the preview image in the shooting scene is greater than the corresponding first parameter threshold and less than a corresponding second parameter threshold, in which the second parameter threshold is greater than the first parameter threshold. The second parameter threshold may be set, such that the ISO parameter value is 1600 and the exposure duration is 50 ms.

Further, after determining that the shooting scene is the dim environment, the brightness level of the dim environment may also be determined. For example, when the ISO value of the preview image captured in the current shooting scene is greater than 400 and less than 1600, the current shooting scene is determined to be a low-mid light dim environment. When the ISO value of the preview image acquired in the shooting scene is greater than 1600, the current shooting scene is a low-light dim environment.

At block 102, when the shooting scene is the dim environment, an exposure ratio of the long exposure pixel to the short exposure pixel is determined.

In detail, after determining that the shooting scene is the dim environment, or specifically, after determining that the shooting scene is the dim environment having the brightness less than the brightness threshold according to the ISO or the exposure duration acquired in the shooting scene, the long exposure pixel and the short exposure pixel are acquired in the shooting scene, thereby calculating the exposure ratio of the long exposure pixel to the short exposure pixel.

The brightness threshold refers to a preset brightness value used to determine a certain brightness level of the shooting scene, and may be preset in a built-in program of the imaging device, or set by the user.

At block 103, the shooting scene is determined to be with a high dynamic range, when the exposure ratio is greater than a first exposure ratio threshold.

When the obtained exposure ratio is greater than the first exposure ratio threshold, it is determined that the current shooting scene is with a high dynamic range. The exposure ratio refers to the long exposure duration of the long exposure pixel to the short exposure duration of the short exposure pixel.

The first exposure ratio threshold refers to a preset threshold for determining the dynamic range of the shooting scene based on the exposure ratio of the long exposure pixel to the short exposure pixel. When the exposure ratio of the shooting scene is greater than the first exposure ratio threshold, the current shooting scene is with a high dynamic range; and when the exposure ratio of the shooting scene is less than the first exposure ratio threshold, the current shooting scene is with a narrow dynamic range.

At block 104, when the shooting scene is with the high dynamic range, the pixel unit array is controlled to expose for a plurality of times with at least two exposure durations to generate a plurality of first images.

In this embodiment, when the shooting scene is with the high dynamic range in the dim environment, the image acquired by the imaging device in a single shot may have a large area of overexposure or a partial of the image is too dark. Therefore, it needs to control the pixel unit array 31 to output the original pixel information of respective exposure pixels for several times, to image according to the original pixel information output each time. Each time when outputting the original pixel information of respective exposure pixels, the pixel unit array 31 adopts the same exposure duration.

In detail, the imaging device controls the long exposure pixels, the short exposure pixels, and the medium exposure pixels of the pixel unit array 31 to expose for several times. After the exposure ends, the photosensitive pixel unit 311 obtains the original pixel information of the long exposure pixels, the original pixel information of the short exposure pixels, and the original pixel information of the medium exposure pixels. When the imaging device controls the pixel unit array 31 to acquire the original pixel information for several times, at least two exposure duration may be adopted.

As a possible implementation, the exposure durations adopted in the process of the imaging device controlling the pixel unit array 31 to acquire the original pixel information for several times are different from each other.

As another possible implementation, the exposure durations adopted in the process of the imaging device controlling the pixel unit array 31 to acquire the original pixel information may include the same exposure duration and an excessively long exposure duration.

It should be noted that, controlling the pixel unit array 31 to expose under the above two types of exposure durations is only an example, and there may be other exposure modes, which is not limited in this embodiment.

Further, each time when the pixel unit array 31 outputs the original pixel information, in the same photosensitive pixel unit 311, the average value of the original pixel information of the obtained long exposure pixel, the original pixel information of the short exposure pixel, and the original pixel information of the medium exposure pixel is calculated to further obtain the merged pixel information. Each photosensitive pixel unit 311 corresponds to one merged pixel information.

As an example, taking the red photosensitive pixel unit illustrated in FIG. 3 as an example, R (1, 1) is a long exposure pixel, R (1, 2) and R (2, 1) are medium exposure pixels, and R (2, 2) is a short exposure pixel. The processor of the imaging device first controls the long exposure pixel R (1, 1), the medium exposure pixel R (1, 2), the medium exposure pixel R (2, 1), and the short exposure pixel R (2, 2) to be simultaneously exposed. After the exposure is completed, the red pixel unit outputs four original pixel information, that is, the original pixel information output by the long exposure pixel R (1, 1), the original pixel information output by the medium exposure pixel R (1, 2), the original pixel information output by the medium exposure pixel R (2,1) and the original pixel information output by the short exposure pixel R (2,2). Thus, the processor of the imaging device controls the photosensitive pixels 3111 in each of the photosensitive pixel units 311 to expose simultaneously in the above manner, and acquires a plurality of original pixel information outputted by each of the photosensitive pixel units 311.

Further, the processor of the imaging device combines and calculates the original pixel information of the same photosensitive pixel unit 311 to obtain a plurality of merged pixel information, and calculates the merged pixel information of each of the photosensitive pixel unit 311 by using the formula of $[R(1,1)+R(2,1)]+[R(1,2)+R(2,2)]/2$. In this case, the processor of the imaging device can calculate a plurality of merged pixel information of the plurality of the photosensitive pixel units 311 in the entire pixel unit array 31.

Further, interpolation calculation is performed based on the merged pixel information corresponding to respective photosensitive pixel units, and a first image corresponding to the exposure duration is generated. Similarly, the first image may be generated correspondingly according to a plurality of the merged pixel information of the plurality of the photosensitive pixel units in the entire pixel unit array.

At block 105, the plurality of first images is composited to generate a composited image.

In detail, the compositing process is performed on the first images generated according to the plurality of merged pixel information of the plurality of photosensitive pixel units 311 in the entire pixel unit array, to obtain a high dynamic range image. Finally, the composited image is displayed as a captured image on the imaging device or stored in a memory of the electronic device.

With the imaging control method of embodiments of the present disclosure, in the high dynamic range of the dim environment, the high dynamic range image is obtained by compositing the merged pixel information corresponding to the original pixel information of respective photosensitive pixel units at different exposure durations, which not only ensures the dynamic range, but also improves imaging effect and image quality and improves the user's shooting experience.

As another possible implementation, when the ISO or exposure duration of the preview image of the shooting scene is greater than or equal to the corresponding second parameter threshold, or when the shooting scene is within a narrow dynamic range where the exposure ratio is less than or equal to the first exposure ratio threshold, the current shooting scene is a low-brightness environment in the dim environment, and the pixel unit array is controlled to expose for several times with the same exposure duration to generate a plurality of second images.

Figure 4:
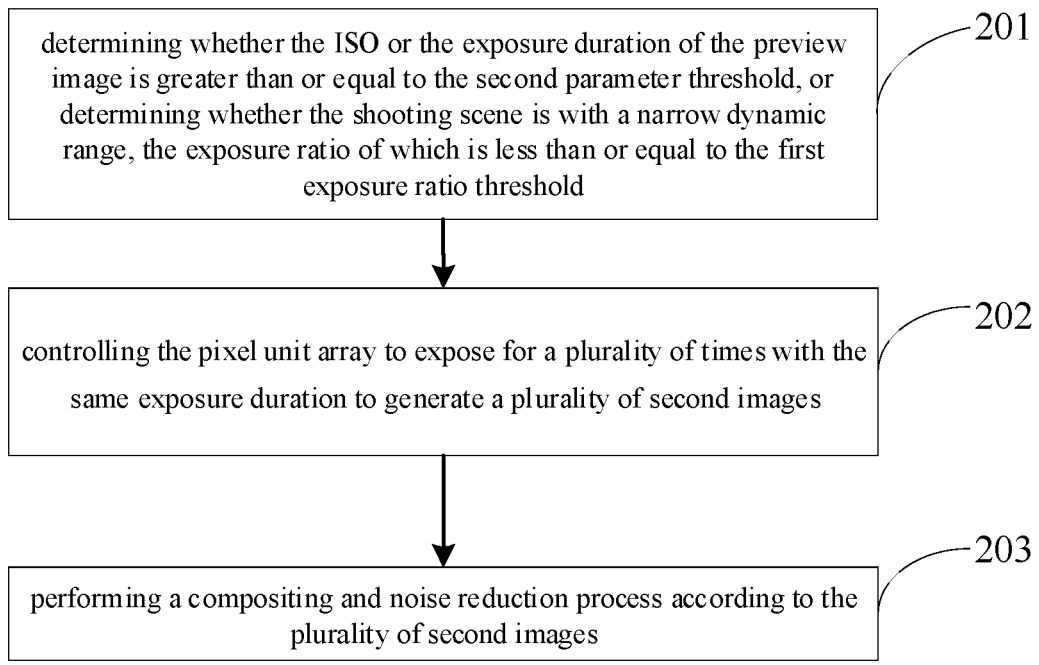
FIG. 4 is a schematic flowchart of another imaging control method according to an embodiment of the present disclosure.

As illustrated in FIG. 4, which is a schematic flowchart diagram of another imaging control method according to an embodiment of the present disclosure, the imaging control method may include the followings.

At block 201, the ISO or exposure duration of the preview image is determined to be greater than or equal to the corresponding second parameter threshold, or the shooting scene is determined to be with a narrow dynamic range, the exposure ratio of which is less than or equal to the first exposure ratio threshold.

In embodiments of the present disclosure, the method for obtaining the ISO or the exposure duration of the preview image is as described in the act at block 101 in the above embodiment, which is not elaborated here.

Further, when the acquired ISO or exposure duration of the preview image of the imaging device in the current shooting scene is greater than or equal to the corresponding second parameter threshold, or when the shooting scene is within the narrow dynamic range, the exposure ratio of which is less than or equal to the first exposure ratio threshold, the current shooting scene is the low-brightness dim environment.

At block 202, the pixel unit array is controlled to expose for several times with the same exposure duration to generate a plurality of second images.

In this embodiment, when the shooting scene is the dim environment with lower brightness, the image acquired by the imaging device in a single shot may have a large area of overexposure or a partial of the image is too dark. Therefore, it needs to control the pixel unit array to expose for several times with the same exposure duration to generate a plurality of second images.

In detail, the imaging device repeatedly controls the long exposure pixels, the short exposure pixels, and the medium exposure pixels of the pixel unit array to expose at the same exposure duration. After the exposure ends, the photosensitive pixel unit obtains the original pixel information of the long exposure pixels, the original pixel information of the short exposure pixels, and the original pixel information of the medium exposure pixels.

Further, each time the pixel unit array outputs the original pixel information, an average value of the original pixel information of the same photosensitive pixel unit is calculated to obtain the merged pixel information, and each of the photosensitive pixel units corresponds to one merged pixel information. The obtaining method of the merged pixel information is as described in the act at block 102 of the above embodiment, and details are not described herein.

Further, interpolation calculation is performed on the merged pixel information corresponding to respective photosensitive pixel units obtained each time, and a corresponding second image can be generated.

At block 203, a compositing and noise reduction process is performed according to the plurality of second images.

Since the current shooting scene is the low-brightness dim environment, the captured image may have noisy points. Therefore, the generated plurality of second images may be subjected to a compositing and noise reduction process, thereby obtaining a composited and noise reduced image. Finally, the composited image is displayed as a captured image on the imaging device or stored in a memory of the electronic device.

With the imaging control method of embodiments of the present disclosure, in the low-brightness environment, the imaging device controls the pixel unit array to exposure for several times with the same exposure duration to generate corresponding plurality of images, and then performs the compositing and noise reduction process on the images, such that the noisy points can be better controlled in the dim environment, which improves the imaging effect and the sharpness, and further improves the user's experience.

In order to implement the above embodiments, the present disclosure also provides an imaging control apparatus.

Figure 5:
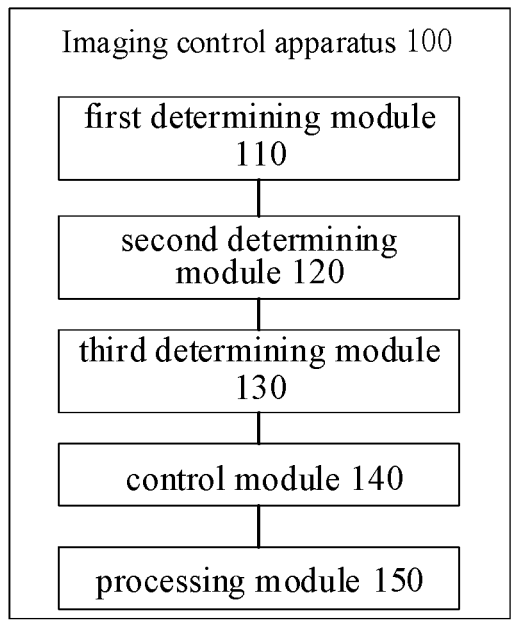
FIG. 5 is a schematic block diagram of an imaging control apparatus according to an embodiment of the present disclosure.

FIG. 5 is a schematic block diagram of an imaging control apparatus according to an embodiment of the present disclosure.

As illustrated in FIG. 5, the imaging control apparatus 100 is applied to an imaging device. The imaging device includes a pixel unit array composed of a plurality of the photosensitive pixel units, each of the photosensitive pixel units includes a plurality of original pixels, and the plurality of original pixels in each photosensitive pixel unit include long exposure pixels, short exposure pixels and medium exposure pixels. The apparatus includes: a first determining module 110, a second determining module 120, a third determining module 130, a control module 140 and a processing module 150.

The first determining module 110 is configured to determine whether a shooting scene of the imaging device is a dim environment.

The second determining module 120 is configured to determine an exposure ratio of the long exposure pixel to the short exposure pixel when the shooting scene is the dim environment.

The third determining module 130 is configured to determine that the shooting scene is with a high dynamic range when the exposure ratio is greater than a first exposure ratio threshold.

The control module 140 is configured to, when the shooting scene is with the high dynamic range, control the pixel unit array to expose for several times with at least two exposure durations to generate a plurality of first images.

The processing module 150 is configured to composite the plurality of first images to generate a composited image.

As another possible implementation, the control module 140 is specifically configured to: during each exposure, calculate an average value of original pixel information of the same photosensitive pixel unit to obtain merged pixel information, in which each photosensitive pixel unit corresponds to one merged pixel information; and generate the first image under the corresponding exposure duration according to the merged pixel information corresponding to each of the photosensitive pixel units.

As another possible implementation, the first determining module 110 is configured to determine whether an ISO or an exposure duration of a preview image in the shooting scene is greater than a first parameter threshold, and determine that the shooting scene of the imaging device is the dim environment when the ISO or the exposure duration of the preview image in the shooting scene is greater than the first parameter threshold.

As another possible implementation, the first determining module 110 is further configured to determine whether the ISO or the exposure duration of the preview image in the shooting scene is less than a second parameter threshold, in which the second parameter threshold is greater than the first parameter threshold.

As another possible implementation, the control module 140 is further configured to, when the ISO or the exposure duration of the preview image is greater than or equal to the second parameter threshold, or when the exposure ratio is less than or equal to the first exposure ratio threshold, control the pixel unit array to expose for a plurality of times with the same exposure duration to generate a plurality of second images. The processing module 150 is configured to perform a compositing and noise reduction process according to the plurality of second images.

As another possible implementation, the imaging control apparatus 100 further includes a display module and a storage module. The display module is configured to display the composited image as a captured image. The storage module is configured to store the composited image as a captured image.

With the imaging control apparatus of embodiments of the present disclosure, in the high dynamic range of the dim environment, the high dynamic range image is obtained by compositing the merged pixel information corresponding to the original pixel information of respective photosensitive pixel units at different exposure durations, which not only ensures the dynamic range, but also improves imaging effect and image quality and improves user's shooting experience.

It should be noted that the above explanation of the embodiment of the imaging control method is also applicable to the imaging control apparatus of the embodiments, and details are not described herein again.

In order to implement the above embodiments, the present disclosure further provides a computer readable storage medium having a computer program stored thereon, wherein when a processor executes the computer program, the imaging control method provided in the above embodiments of the present disclosure is implemented.

The present disclosure also provides an electronic device.

Figure 6:
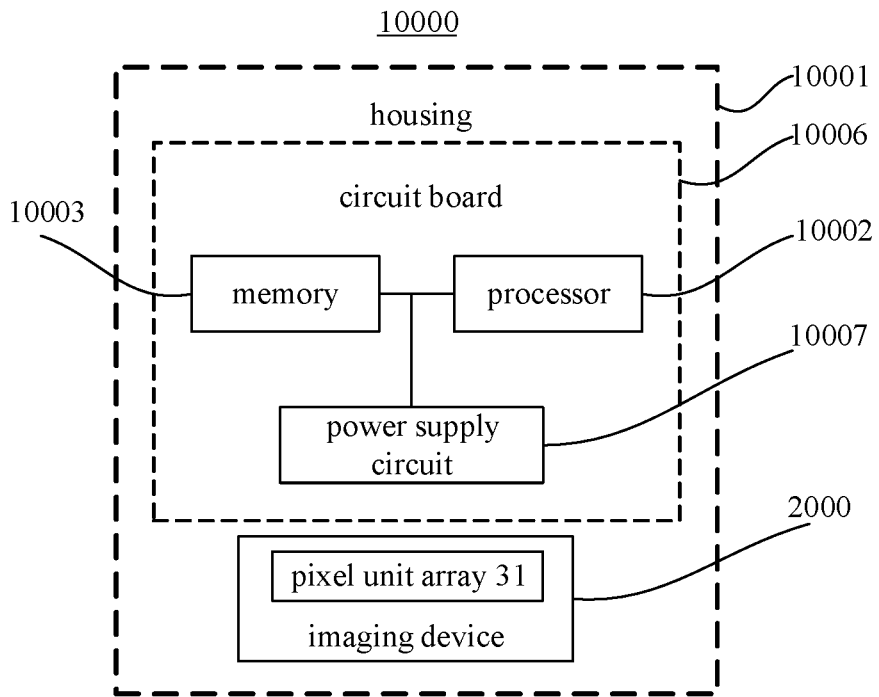
FIG. 6 is a schematic diagram of an electronic device according to an embodiment of the present disclosure.

FIG. 6 is a schematic diagram of an electronic device according to an embodiment of the present disclosure. Referring to FIG. 6, the electronic device 10000 of the present disclosure includes a housing 10001, a processor 10002, a memory 10003, a circuit board 10006, a power supply circuit 10007 and an imaging device 2000. The circuit board 10006 is enclosed by the housing 10001. The processor 10002 and the memory 10003 are positioned on the circuit board 10006. The power supply circuit 10007 is configured to provide power for respective circuits or components of the electronic device 10000. The memory 10003 is configured to store executable program codes.

The imaging device 2000 includes a pixel unit array 31. The pixel unit array 31 includes a plurality of photosensitive pixel units. Each photosensitive pixel unit includes a plurality of original pixels. The plurality of original pixels in each photosensitive pixel include long exposure pixels, short exposure pixels, and medium exposure pixels.

The processor 10002 is configured to run a program corresponding to the executable program codes by reading the executable program codes stored in the memory, to perform the imaging control method described in the above embodiments.

In an embodiment, the imaging device 2000 includes a front camera and a rear camera.

Figure 7:
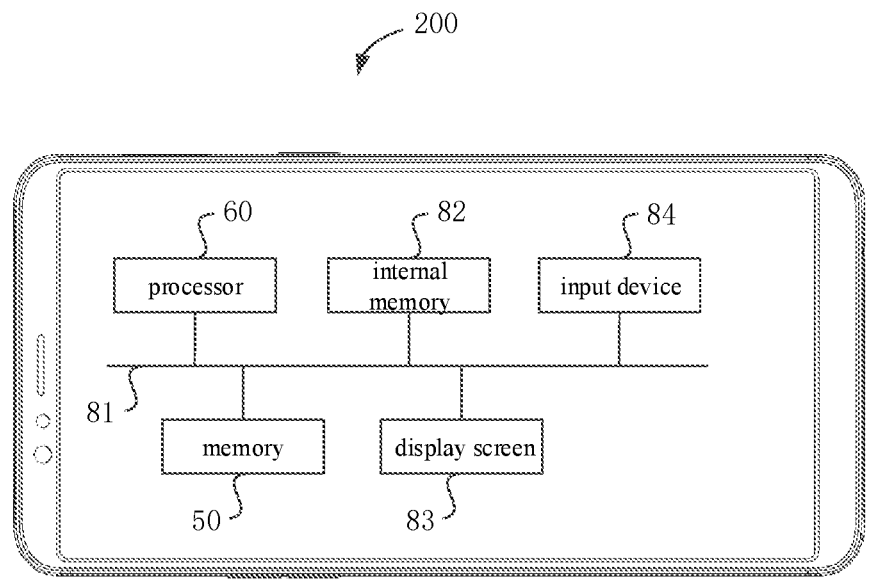
FIG. 7 is a schematic diagram of an electronic device according to another embodiment of the present disclosure.

As illustrated in FIG. 7, the present disclosure further provides another electronic device 200. The electronic device 200 includes a memory 50 and a processor 60. Computer readable instructions are stored in the memory 50. When the computer readable instructions are executed by the processor 60, the processor 60 is caused to perform the imaging control method of any of the above embodiments.

FIG. 7 is a schematic diagram illustrating the internal structure of an electronic device 200 in an embodiment. The electronic device 200 includes a processor 60, a memory 50 (e.g., a non-volatile storage medium), an internal memory 82, a display screen 83, and an input device 84 that are coupled via a system bus 81. The memory 50 of the electronic device 200 stores an operating system and computer readable instructions. The computer readable instructions are executable by processor 60 to implement the imaging control method of embodiments of the present disclosure. The processor 60 is configured to provide computing and control capabilities to support the operation of the entire electronic device 200. The internal memory 50 of the electronic device 200 provides an environment for the operation of computer readable instructions in the memory 52. The display screen 83 of the electronic device 200 may be a liquid crystal display screen or an electronic ink display screen. The input device 84 may be a touch layer covered on the display screen 83, or may be a button, a trackball or a touch pad provided on the housing of the electronic device 200, or an external keyboard, trackpad or mouse. The electronic device 200 may be a mobile phone, a tablet computer, a notebook computer, a personal digital assistant, or a wearable device (e.g., a smart bracelet, a smart watch, a smart helmet, smart glasses). It will be understood by those skilled in the art that the structure illustrated in FIG. 6 is only a schematic diagram of a part of the structure related to the solution of the present disclosure, and does not constitute a limitation of the electronic device 200 to which the solution of the present disclosure is applied, and specifically, the electronic device 200 may include more or few components than those illustrated in the figures, or some components may be combined, or the electronic device 200 may have different component arrangement.

Figure 8:
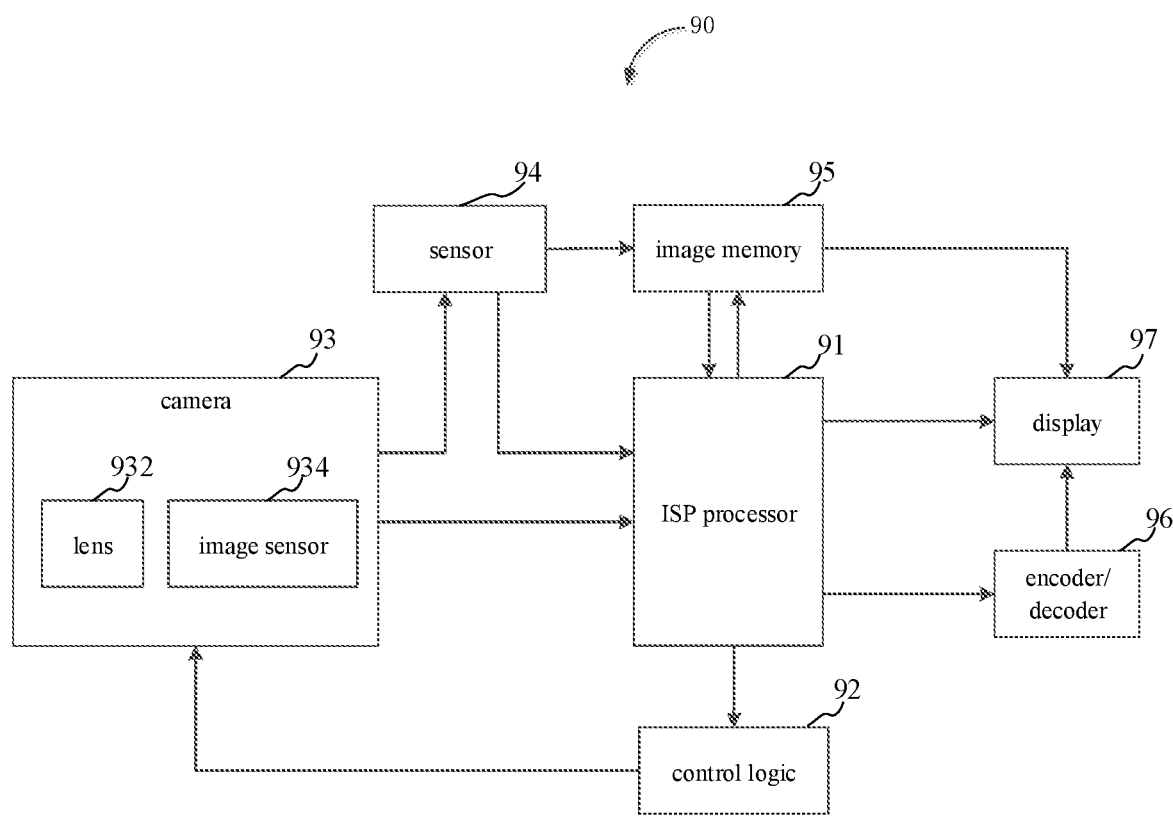
FIG. 8 is a schematic diagram of an image processing circuit according to embodiments of the present disclosure.

As illustrated in FIG. 8, the electronic device 200 of embodiments of the present disclosure includes an image processing circuit 90. The image processing circuit 90 can be implemented by using hardware and/or software components, including various types of processing unit defining ISP (Image Signal Processing) pipelines. FIG. 7 is a schematic diagram of an image processing circuit 90 in one embodiment. As illustrated in FIG. 7, for convenience of explanation, only various aspects of the image processing technique related to the embodiment of the present disclosure are illustrated.

As illustrated in FIG. 8, the image processing circuit 90 includes an ISP processor 91 (ISP processor 91 may be the processor 60) and a control logic 92. The image data captured by a camera 93 is first processed by the ISP processor 91, which analyzes the image data to capture image statistics information that can be used to determine one or more control parameters of the camera 93. The camera 93 may include one or more lenses 932 and an image sensor 934. The image sensor 934 may include a color filter array (e.g., a Bayer filter), and the image sensor 934 may obtain light intensity and wavelength information captured by each imaging pixel and provide a set of original image data that may be processed by ISP processor 91. A sensor 94, such as a gyroscope, can provide acquired image processing parameters (such as anti-shake parameters) to the ISP processor 91 based on an interface type of the sensor 94. The interface of the sensor 94 may be a SMIA (Standard Mobile Imaging Architecture) interface, other serial or parallel camera interface, or a combination of the above.

In addition, the image sensor 934 may further transmit the original image data to the sensor 94. The sensor 94 may provide the original image data to ISP processor 91 based on the interface type of the sensor 94, or may store the original image data into the image memory 95.

The ISP processor 91 processes the original image data pixel by pixel in a plurality of formats. For example, each image pixel may have a bit depth of 8, 10, 12, or 14 bits, and the ISP processor 91 may perform one or more image processing operations on the original image data, and collect statistical information about the image data. The image processing operations may be performed with the same or different bit depth precision.

The ISP processor 91 can also receive image data from the image memory 95. For example, the sensor 94 transmits original image data to the image memory 95 via the interface, and the original image data in the image memory 95 is provided to the ISP processor 91 for processing. The image memory 95 may be the memory 50, a portion of the memory 50, a storage device, or a separate dedicated memory within an electronic device, and may include DMA (Direct Memory Access) characteristics.

When receiving the original image data from the image sensor 934 or from the sensor 94 or from the image memory 95, the ISP processor 91 can perform one or more image processing operations, such as time domain filtering. The processed image data may be sent to the image memory 95 for additional processing before being displayed. The ISP processor 91 receives the processed data from the image memory 95 and performs image data processing on the processed data in the original domain and in the RGB and YCbCr color spaces. The image data processed by the ISP processor 91 may be output to the display 97 (the display 97 can include the display screen 83) for viewing by the user and/or further processing by a graphics engine or a GPU (Graphics Processing Unit). Further, the output of the ISP processor 91 may also be sent to the image memory 95, and the display 97 may read image data from the image memory 95. In one embodiment, the image memory 95 may be configured to implement one or more frame buffers. Additionally, the output of ISP processor 91 may be sent to an encoder/decoder 96 for encoding/decoding image data. The encoded image data may be saved and decompressed before being displayed on the display 97. The encoder/decoder 96 may be implemented by a CPU or GPU or coprocessor.

The statistics data determined by the ISP processor 91 may be sent to the control logic 92. For example, the statistical data may include statistical information of the image sensor 934 such as auto exposure, auto white balance, auto focus, flicker detection, black level compensation, shading correction of the lens 932, and the like. The control logic 92 may include processing elements and/or microcontrollers that execute one or more routines (such as firmware), and one or more routines may determine the control parameters of the camera 93 and the control parameters of the ISP processor 91 based on received statistical data. For example, the control parameters of the camera 93 may include the control parameters of the sensor 94 (e.g., gain, integration time for exposure control, anti-shake parameters), flash control parameters of the camera, control parameters (e.g., focal length for focus or zoom) of the lens 932, or the combination of these parameters. The ISP control parameters may include gain levels and color correction matrices for automatic white balance and color adjustment (e.g., during RGB processing), as well as shading correction parameters of the lens 932.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples can be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be implemented by hardware, software, firmware or the combination thereof. In the above embodiments, a plurality of steps or methods may be implemented by the software or firmware stored in the memory and executed by the appropriate instruction execution system. For example, if it is implemented by the hardware, likewise in another embodiment, the steps or methods may be implemented by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for imaging control, applicable to an imaging device, and the method comprising:
    when an ISO or an exposure duration of a preview image in a shooting scene is greater than a first parameter threshold and less than a second parameter threshold, and when an exposure ratio of a long exposure pixel to a short exposure pixel is greater than a first exposure ratio threshold, controlling a pixel unit array of the imaging device to expose for a plurality of times with at least two exposure durations, to generate a plurality of first images, and compositing the plurality of first images to generate a composited image, wherein the second parameter threshold is greater than the first parameter threshold; and
    when the ISO or the exposure duration of the preview image in the shooting scene is greater than or equal to the second parameter threshold, or when the exposure ratio of the long exposure pixel to the short exposure pixel is less than or equal to the first exposure ratio threshold, controlling the pixel unit array of the imaging device to expose for the plurality of times with the same exposure duration, to generate a plurality of second images, and performing a compositing and noise reduction process according to the plurality of second images.

2. The method according to claim 1, wherein controlling the pixel unit array to expose for a plurality of times with at least two exposure durations to generate the plurality of first images, comprises:
    during each exposure, calculating an average value of original pixel information of long exposure pixels, medium exposure pixels, and short exposure pixels in each photosensitive pixel unit of the pixel unit array to obtain merged pixel information, wherein each photosensitive pixel unit corresponds to one merged pixel information; and
    generating the first image according to the merged pixel information corresponding to each photosensitive pixel unit.

3. The method according to claim 1, further comprising:
    displaying or storing the composited image as a captured image.

4. The method according to claim 1, wherein the at least two exposure durations comprise:
    at least two exposure durations different from each other; or
    at least two exposure durations in which one exposure duration is an excessively long exposure duration and the remaining exposure durations are identical and shorter than the excessively long exposure duration.

5. An apparatus for imaging control, applicable to an imaging device, and the apparatus comprising:
    a processor; and
    a memory, configured to store software modules executable by the processor,
    wherein the processor is configured to run a program corresponding to the software modules by reading the software modules stored in the memory, the software modules comprising:
        a control module, configured to, when an ISO or an exposure duration of a preview image in a shooting scene is range greater than a first parameter threshold and less than a second parameter threshold, and when an exposure ratio of a long exposure pixel to a short exposure pixel is greater than a first exposure ratio threshold, control a pixel unit array of the imaging device to expose for a plurality of times with at least two exposure durations to generate a plurality of first images,
    wherein the second parameter threshold is greater than the first parameter threshold; and
        a processing module, configured to perform compositing process according to the plurality of first images to generate a composited image,
    wherein the control module is further configured to, when the ISO or the exposure duration of the preview image in the shooting scene is greater than or equal to the second parameter threshold, or when the exposure ratio of the long exposure pixel to the short exposure pixel is less than or equal to the first exposure ratio threshold, control the pixel unit array of the imaging device to expose for the plurality of times with the same exposure duration, to generate a plurality of second images; and
    wherein the processing module is further configured to perform a compositing and noise reduction process according to the plurality of second images.

6. The apparatus according to claim 5, wherein the control module is configured to:
    during each exposure, calculate an average value of original pixel information of long exposure pixels, medium exposure pixels and short exposure pixel in each photosensitive pixel unit of the pixel unit array to obtain merged pixel information, wherein each photosensitive pixel unit corresponds to one merged pixel information; and
    generate the first image according to the merged pixel information corresponding to each photosensitive pixel unit.

7. The apparatus according to claim 5, wherein the software modules further comprise:
    a display module, configured to display the composited image as a captured image; and
    a storage module, configured to store the composited image as a captured image.

8. The apparatus according to claim 5, wherein the at least two exposure durations comprise:

at least two exposure durations different from each other; or at least two exposure durations in which one exposure duration is an excessively long exposure duration and the remaining exposure durations are identical and shorter than the excessively long exposure duration.

9. An electronic device, comprising a housing, a memory, a processor, a circuit board, a power supply circuit, and an imaging device, wherein, the circuit board is arranged inside a space enclosed by the housing;

the processor and the memory are disposed on the circuit board;

the power supply circuit is configured to provide power for respective circuits or components of the electronic device;

the imaging device comprises a pixel unit array composed of a plurality of photosensitive pixel units, each photosensitive pixel unit comprises a plurality of original pixels, and the plurality of original pixels in each photosensitive pixel unit comprise long exposure pixels, short exposure pixels and medium exposure pixels;

the memory is configured to store executable program codes; and the processor is configured to execute a program corresponding to the executable program codes by reading the executable program codes stored in the memory to:

when an ISO or an exposure duration of a preview image in a shooting scene is greater than a first parameter threshold and less than a second parameter threshold, and when an exposure ratio of a long exposure pixel to a short exposure pixel is greater than a first exposure ratio threshold, control the pixel unit array to expose for a plurality of times with at least two exposure durations, to generate a plurality of first images, and composite the plurality of first images to generate a composited image; and when the ISO or the exposure duration of the preview image in the shooting scene is greater than or equal to the second parameter threshold, or when the exposure ratio of the long exposure pixel to the short exposure pixel is less than or equal to the first exposure ratio threshold, control the pixel unit array of the imaging device to expose for the plurality of times with the same exposure duration, to generate a plurality of second images, and perform a compositing and noise reduction process according to the plurality of second images.

10. The electronic device according to claim 9, wherein the processor is further configured to:

determine whether an ISO or an exposure duration of a preview image in the shooting scene is greater than a first parameter threshold and less than a second parameter threshold; and determine the exposure ratio when the ISO or the exposure duration of the preview image in the shooting scene is greater than the first parameter threshold and less than the second parameter threshold.

11. The electronic device according to claim 9, wherein the electronic device comprises a mobile phone, and a tablet computer.

12. The electronic device according to claim 9, wherein the imaging device comprises a front camera and a rear camera.

* * * * *